United States Patent [19]
Preston

[11] 3,762,248
[45] Oct. 2, 1973

[54] POWERED STOP FOR BAR CUTTING MACHINES
[75] Inventor: Charles L. Preston, Cincinnati, Ohio
[73] Assignee: American Standard, Inc., New York, N.Y.
[22] Filed: Oct. 7, 1971
[21] Appl. No.: 187,366

[52] U.S. Cl. .............................................. 82/34 A
[51] Int. Cl. ............................................ B23b 3/36
[58] Field of Search ................................. 82/34 A

[56] References Cited
UNITED STATES PATENTS

| | | | |
|---|---|---|---|
| 3,221,580 | 12/1965 | Millward | 82/34 A |
| 2,277,085 | 3/1942 | Drissnor | 82/34 A X |
| 1,524,778 | 2/1925 | Brown | 82/34 A X |
| 3,274,860 | 9/1966 | Lamphere | 82/34 A |

FOREIGN PATENTS OR APPLICATIONS

| | | | |
|---|---|---|---|
| 930,681 | 7/1963 | Great Britain | 82/34 A |
| 840,431 | 7/1960 | Great Britain | 82/34 A |

Primary Examiner—Harrison L. Hinson
Attorney—John E. McRae et al.

[57] ABSTRACT

In a cutting machine wherein bar stock is fed through a spindle (chuck): the improvement comprising a bar-deflecting element which automatically ejects from the spindle any bar remnant too short to be gripped by the chuck. The bar-deflecting element forms part of a sensor network that artifically limits the stroke of a novel push-back stop means, whereby a new oncoming bar projects slightly further into the machine than would otherwise be the case; this non-normal positioning of the new bar enables the leading end of the bar to be faced off during the ensuing cutting cycle, thereby eliminating the possibility of one scrap part and one non-useful cycle. By facing off the new bar during the cutting cycle I eliminate possible tool breakage due to drills walking on the rough bar end. Preferable the novel stop means is powered and mounted so that it is out of the way of end-working tools or side-working tools at the loading station; this enables the machining operations to be divided among greater numbers of tools (stations), thereby in some cases cutting down on cycle time.

4 Claims, 20 Drawing Figures

INVENTOR.
CHARLES L. PRESTON

INVENTOR.
CHARLES L. PRESTON

POWERED STOP FOR BAR CUTTING MACHINES

FIGS. 1 THROUGH 4

Figure 1:
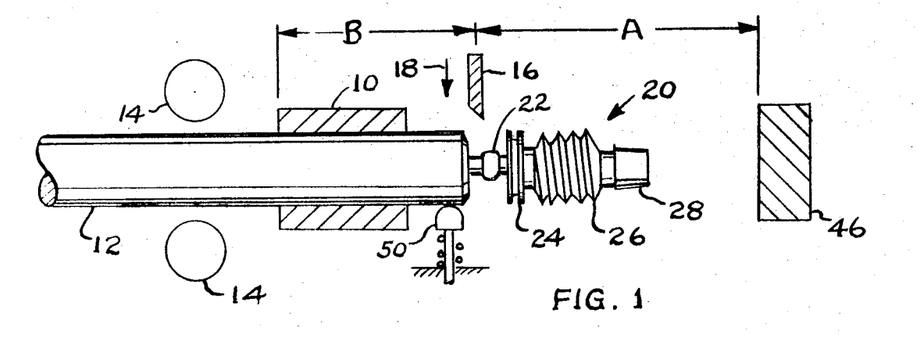
FIGS. 1 through 8 are schematic illustrations showing how this invention operates during cyclic movements of a bar-cutting machine.

FIG. 1 schematically illustrates a cutting machine (screw machine) having a rotary chuck or collect structure 10 arranged to grip round bar stock 12 previously fed into the machine by opposed feed rollers 14. As shown in FIG. 1 the stock is gripped by the jaws of chuck 10 and is released from the feed rollers 14; i.e. the feed rollers are mechanically separated or drawn away from the bar. In the FIG. 1 position jaws 10 are enabled to be rotated around the chuck axis to thus rotate the stock 12 past a work-severing tool 16. Movement of tool 16 in the arrow 18 direction causes the previously formed work piece 20 to be severed from bar 12 and gravitationally eject from the machine.

The configuration of work piece 20 will of course be determined by the nature of the cutting operations performed by the various cutting tools (not shown). The illustrated work piece is a common screw machine part used as a valve stem in faucet type valves. It comprises a knob-like valve disc attachment portion 22, a grooved seal-ring portion 24, a threaded barrel portion 26, and a knurled handle-attachment portion 28.

Figure 9:
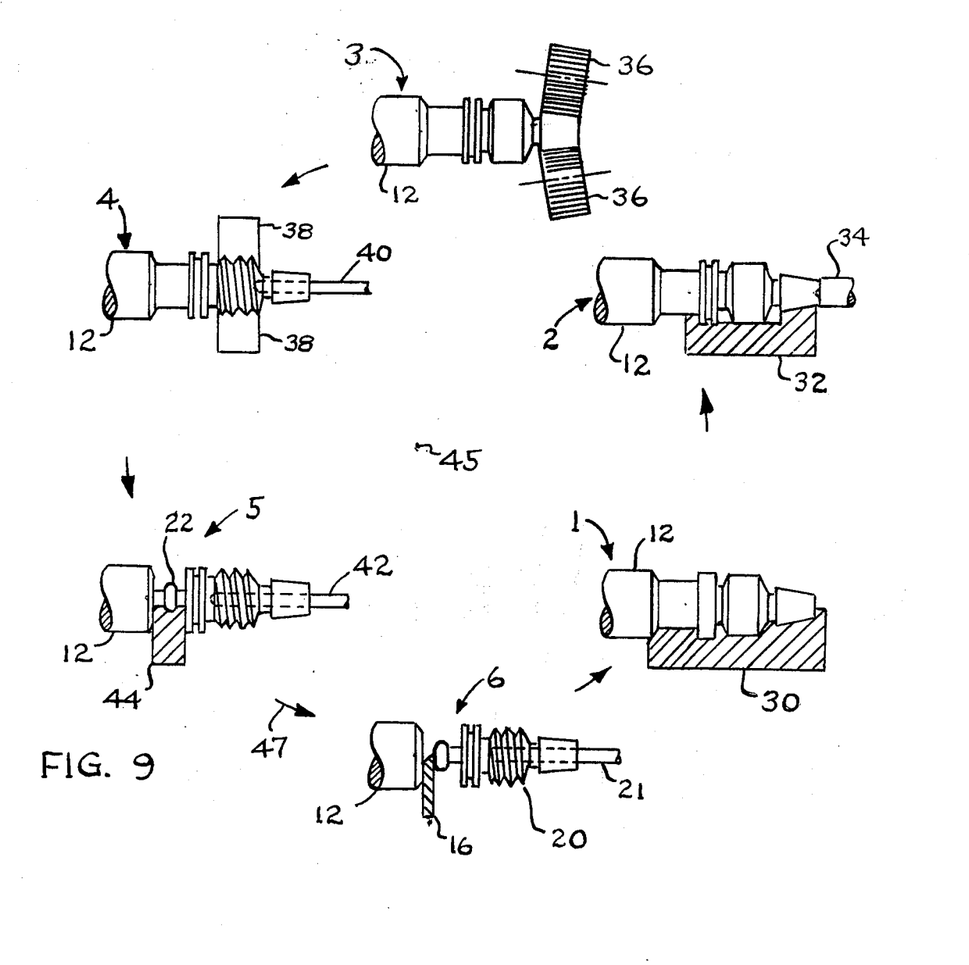
FIG. 9 is a schematic illustration of cutting operations performed by a six spindle cutting machine (screw machine) which can utilize this invention.

FIG. 9 MACHINE STATIONS

Formation of work piece 20 may be accomplished in a six spindle screw machine having the various cutting stations or positions illustrated schematically by numbers 1 through 6 in FIG. 9. In station 6 a workpiece 20 is internally threaded or taped by the tap 21, after which the completed workpiece is severed from the bar stock by tool 16. Then a new length of bar stock is fed into the space vacated by workpiece 20. In station 1 the new stock is formed to rough shape by the forming tool 30. In station 2 the rough piece is shaved by tool 32 and spot-drilled by end working tool 34. At station 3 knurling forces are applied to the workpiece by the rotating knurling tools 36. Station 4 includes thread-forming rolls 38 and end drill 40. In station 5 the depth of the drilled hole is increased by a second drill 42, and the knob portion 22 is produced by the forming tool 44.

The schematically illustrated cutting machine includes six separate spindles equally spaced for intermittent cyclic rotation around the machine head axis 45, as denoted by arrows 47. Such intermittent cyclic rotation allows each spindle to proceed from station to station to permit the various loading, cutting and ejecting operations.

FIG. 1 STARTING THE CYCLE

Figure 2:
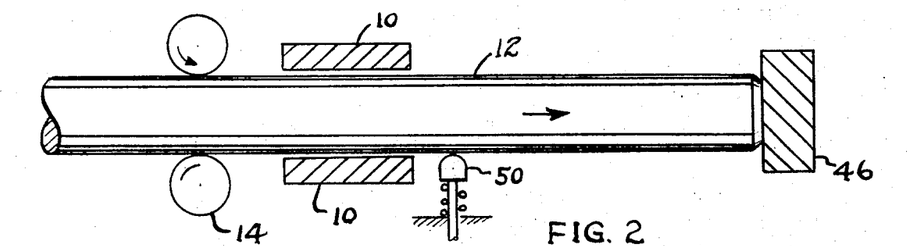

FIG. 1 represents conditions at the ejecting-loading station 6. As shown in FIG. 1, the completed workpiece 20 is about to be severed by tool 16. After tool 16 has severed the piece and drawn back to its illustrated retracted position, the jaws 10 are retracted from bar 12 and the rotary feed rollers 14 are closed on the bar to feed same against a stop element 46, as shown in FIG. 2. Thereafter stop element 46 is powered leftwardly from the FIG. 2 stock-intercept position to the FIG. 3 push-back position. The push-back action is advantageous in that it accurately locates the workpiece without any rebound of the piece (because the stop is always engaged with the stock during the leftward push-back movement).

Figure 3:
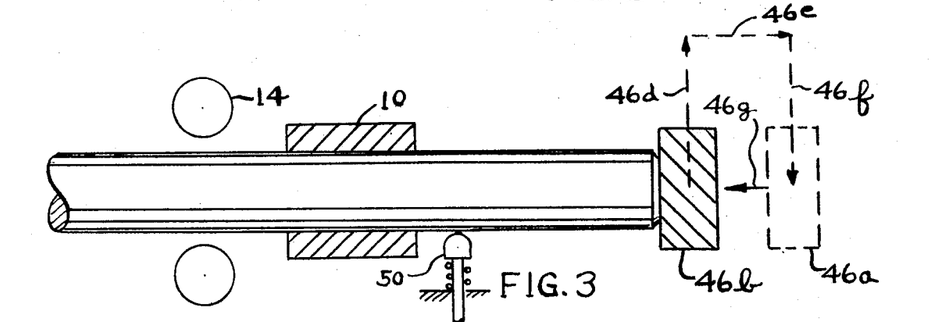
Figure 4:
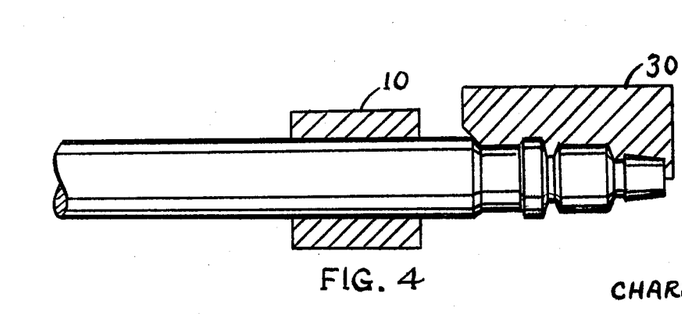

While the stock is in the FIG. 3 position jaws 10 are closed and rollers 14 opened, after which the spindle is advanced to station 1 (FIG. 9) for the first cutting operation. FIG. 4 shows the first forming tool 30 in relation to the work and the rotary chuck 10. The various other forming tools are shown in FIG. 9.

Feed rollers 14 are located at loading station 6 to service each of the six spindles (jaws) 10 as they move into the loading station. A rotary reel structure (not shown) supports the various lengths of bar stock 12 at their remote ends. Normally the bars will each be a standard length, for example 12 feet. On occasion shorter bars may be used. As the machine cycles the bars through the six stations each bar becomes shorter, until the bar remnants are too short to be gripped by chuck 10. FIGS. 5 through 8 illustrate the machine operation when a bar is almost depleted and needs replacement by a new full length bar.

FIGS. 5–8 BAR REMNANT EJECTION

Figure 5:
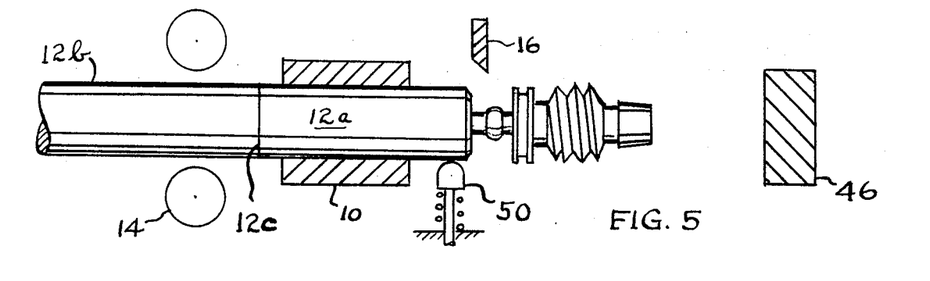
Figure 6:
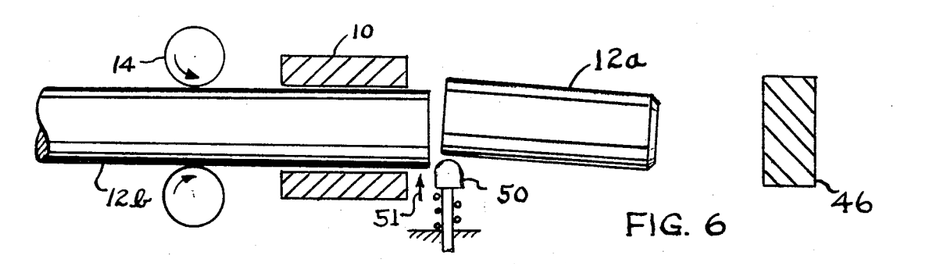

FIG. 5 operation is the same as FIG. 1 operation except that the bar remnant 12a is being advanced rightwardly by the new full length bar 12b (note bread line 12c) instead of directly by the feed rolls. FIG. 6 shows bar remnant 12a after it has been driven rightwardly out of chuck 10 into the free space adjacent stop 46. At this time a schematically illustrated detector element 50 is propelling the bar remnant, as denoted by arrow 51, to assist gravitational discharge of the remnant from the machine. The oncoming new bar 12b keeps coming rightwardly under the feed by rollers 14, and ultimately the new bar strikes stop 46 while the stop is in its FIG. 7 dotted line position 46a. Thereafter the stop is powered leftwardly to its FIG. 7 full line position 46c to exert a push-back action on the bar. The FIG. 7 movement generally accomplishes the same purpose as the FIG. 3 movement, namely accurate positionment of the work; however the FIG. 7 movement has the additional purpose of locating the leading end of the new bar in a position where it can be faced off in station 1 (FIG. 9). Thus, the FIG. 7 movement is slightly less than the FIG. 3 movement such that the final position 46c is slightly to the right of position 46b, whereby the rough end of the bar can be machined off without causing the workpiece to be scrap.

Figure 7:
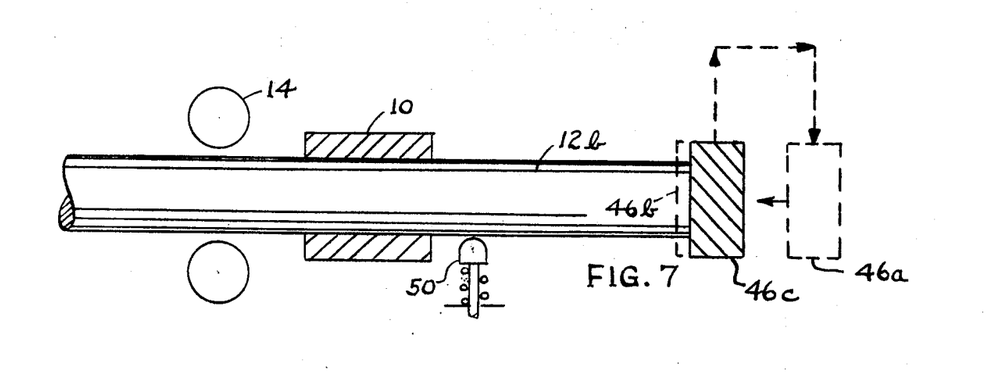
Figure 8:
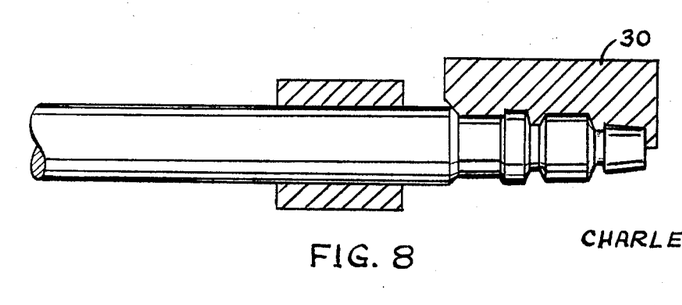

The shorter FIG. 7 movement may be achieved as a response to the FIG. 6 ejecting movement of detector 50. In one mechanism the detector movement (FIG. 6) opens an air valve that supplies compressed air to a pneumatic cylinder; the cylinder moves an abutment into the path of the power means for stop element 46, and in this manner limits or curtails the power element stroke. The FIG. 6 ejecting movement of detector 50 occurs only when the bar is a short unusable remnant not when the bar is long enough to be usable as in FIG. 2; hence stop element 46 will have its shortened push back stroke only when necessary for face-off treatment of the new bar end.

It is desirable that each of the six stations (FIG. 9) be useful for both end-working tools and side-working tools, since full tool utilization sometimes reduces cycle time. If station 6 is to be fully useful for end-working tool 21 and side-working tool 16 it is necessary that stop element 46 be out of alignment with the bar during the cutting cycle (to make room for tool 21). FIG. 3 illustrates a sidewise movement of the stop element to put it in a non-obstructing position. Stroke 46d may take place generally before tap 21 begins to work, stroke 46e may take place while tap 21 is working, and stroke 46f may take place after tap 21 has been retracted from the work. The various movements may be timed from the conventional machine cams, not shown.

Figure 10:
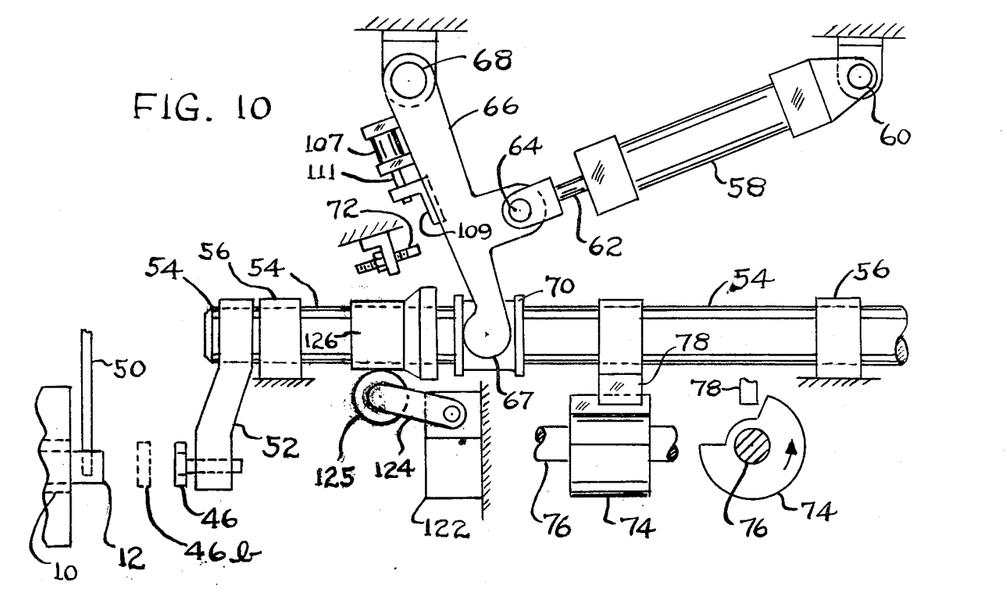
FIGS. 10 through 12 are fragmentary views showing parts of a novel bar stop means and sensor control made according to this invention.

FIG. 10

FIG. 10 shows the general features of a mechanism for powering the stop element 46 shown schematically in FIGS. 1 through 3 and 5 through 7. In FIG. 10 the stop element 46 is carried by an arm 52 depending from a horizontal shaft 54 mounted for reciprocal and rotational movements in bearings 56. The shaft-arm assembly is powered by a pneumatic cylinder 58, swingably suspended at 60 and having a piston rod 62 pivotally joined at 64 to a lever arm 66 which is suspended at 68. As compressed air is admitted to the right end of cylinder 58 the rod 62 forces lever 66 leftwardly so that its circular cam end 67 acts on the flanged collar 70 carried by shaft 54; the shaft is thereby moved until arm 66 strikes the fixed (adjustable) abutment 72, at which time stop element 46 will be in position 46b (this corresponds to position 46b of FIG. 3).

Pressurization of the right end of cylinder 58 may be controlled by the machine cam that controls the clutch-out of jaws 10. Thus, cylinder 58 will be energized through a cam-operated valve (not shown) a suitable time after the feed rollers have advanced bar 12 against stop 46. The subsequent side movements of stop 46 denoted by numbers 46d and 46f (FIG. 3) may be accomplished by the schematically-illustrated machine cam 74 shown in FIG. 10. As shown, the cam is carried by a continuously rotating shaft 76 at one r.p.m. per cycle. During such rotation the steep cam face contacts the dog 78 which depends from shaft 54, thus effecting the desired shaft 54 rotation and swing-out movement of stop 46 (movement 46d in FIG. 3). Movement 46e of the stop may be accomplished by pressurizing the left-end of cylinder 58 by another machine cam, not shown. Return swing-in movement 46f occurs when the other steep face of cam 74 reaches dog 78. In actual machines it is not practical to provide the simplified direct cam actuation of elements 74 and 78, but generally similar timing principles, well known, are readily usable. FIG. 10 is a semi-schematic representation to illustrate how the novel push-back stop mechanism of this invention can be operably connected with a conventional cutting machine.

Figure 11:
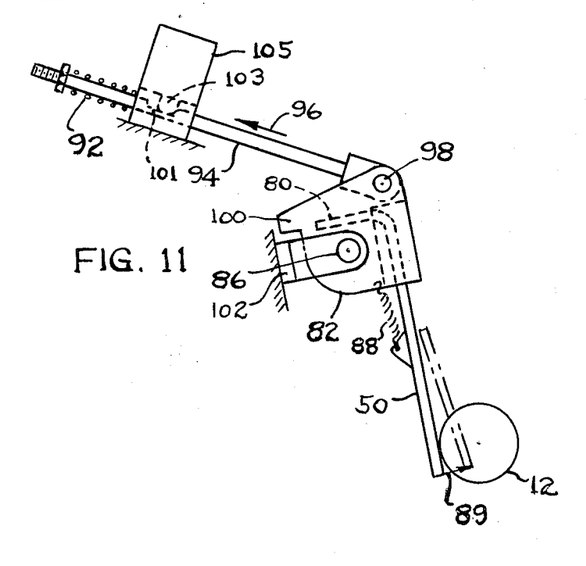
Figure 12:
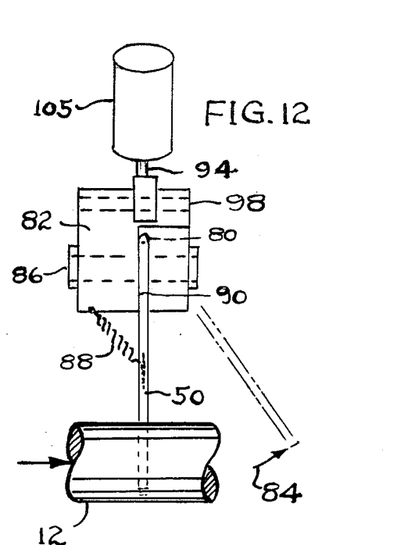

BAR REMNANT DETECTOR (FIGS. 11 AND 12)

As previously noted, this invention envisions that bar remnants too short for gripment by jaws 10 be automatically ejected from the machine without being cycled through the cutting stations; also that the next full length bar be automatically inserted into the machine a sufficient distance that its leading end is faced off during the ensuing cycle. The desired ejecting and control functions are provided by detector 50 shown schematically in FIG. 6. The general features of an actual detector are shown in FIGS. 11 and 12. As there shown the detector arm 50 includes an angularly turned end 80 rotatably mounted in a block element 82 for orbital rotation of the arm in an arc or plane designated by numeral 84 (FIG. 12). The block is mounted for rotation about the axis of a shaft 86 for orbital movement in the arc designated by numeral 89 (FIG. 11). A tension spring 88 is trained between block 82 and arm 50 to bias the arm against arc 84 movement; block 82 is cut away to provide a limit face 90 which prevents spring 88 from pulling arm 50 too far to the left (in FIG. 12). Another spring 92 acts on a reciprocable rod 94 to boas the rod in the arrow 96 direction. The rod is pivotally connected at 98 to block 82, such that the spring 92 force tends to swing block 82 counter-clockwise about shaft 86 (in FIG. 11) until limited by engagement of the block's flange 100 with the edge of fixed mount plate 102. When a bar 12 is in the machine the operating end of arm 50 is deflected by the bar to the FIG. 11 full line position; thus flange 100 is only operable to to limit arm 50 movement after a bar has been ejected by arm 50.

Assuming the feed rollers 14 are handling bar stock of sufficient length (FIGS. 1 through 3), arm 50 will remain in the full line positions of FIGS. 11 and 12. When the bar has been shortened to an unusable bar remnant (FIGS. 5 and 6) arm 50 will be swung by spring 92 through the profile plane of the bar as denoted by arc 89. The arm will thereby eject the bar remnant. As the next oncoming (new) bar strikes arm 12 it will push the arm rightwardly in the swinging arc depicted by numeral 84. After a short travel of the bar, the tip end of arm 50 will snap off the end of the bar and will clear the upper side surface of the bar. Ultimately, spring 88 will draw arm 50 back to the FIG. 12 full line position; after this drawback or reset period the spring 92 force is overcome so that are 50 is returned to its FIG. 11 full line position.

Rod 94 is formed with a flat 101 ridable on the push-button actuator 103 of pneumatic valve 105. During arrow 96 movement of rod 94 the resultant upward deflection of button 103 causes valve 105 to be opened. In the actual mechanism valve 105 controls flow of compressed air to a small pneumatic cylinder 107 (FIG. 10) carried on arm 66. Opening valve 105 pressurizes the upper end of cylinder 107 so that an abutment element 109 (carried by piston rod 111) moves downward into registry with fixed abutment 72. Accordingly, when cylinder 58 subsequently moves arm 66 leftwardly the arm 66 stroke is shortened, due to the fact that the abutment 72 engages abutment 109 instead of the face of lever 66. This arrangement causes stop element 46 to be moved to position 46c (FIG. 7) instead of position 46b (FIG. 3). As previously noted, the shortened push back stroke is achieved only when detector 50 senses the presence of an unduly short bar remnant. At other times detector 50 maintains its full line position (FIGS. 11 and 12) such that air valve 105 is ineffective to pressurize cylinder 107.

The term "unduly short bar remnant" refers to a bar remnant that is too short to be adequately gripped by jaws 10 (FIG. 6) when the leading end of the bar has been advanced into the cutting position. Thus, bar remnant 12a (FIG. 6) is such a bar, whereas bar 12 (FIG. 2) is not. If the bar were fed into its final cutting position without the "push back" stroke of element 46 the bar might be loosely or partially held by jaws 10 in a wobbly condition; the condition might not be sensed by detector 50, in which case the workpiece might later wobble under cutting pressures to jam in the machine and porduce tool breakage. The push back stroke of element 46 eliminates this problem because it allows bar remnant 12a to overfeed beyond the cutting position before reaching element 46 (FIG. 6 condition). The bar remnant can eject harmlessly from the machine.

The initial intercept position of stop element 46 need not be as far from the plane of severing tool 16 as shown in FIGS. 1 and 5. However, the intercept position should be further from the tool 16 severing plane than the axial space occupied by chuck 10 and tool 16. Thus, the intercept travel distance A should be greater than the chuck-tool space B in order that the bar remnant completely clear the chuck before reaching stop 46.

FAIL SAFE MECHANISM

It is intended that the mechanism operate at very high speed for reduced cycle time. With such high speed operation, it is conceivable that detector 50 might not operate quickly enough to eject remnant bar 12a from the machine; i.e. that bar section 12b would jam bar remnant 12a against stop element 46 so that the remnant would constitute an obstruction to complete push back action of the stop element to position 46c (FIG. 7). The FIG. 10 mechanism, therefore includes a failure-responsive means that shuts down the machine in event of incomplete push back travel of element 46.

The failure-responsive means is shown in FIG. 10 as a normally-open switch 122 having a lever actuator 124 equipped with a ball or roller 125 in ridable contact with a cam collar 126 carried by shaft 54; in the illustrated position, the roller-cam engagement causes switch 122 to be open. As shaft 54 moves stop element 46 toward position 46b (or 46c) the roller rides up on the cam peak (lobe) to close switch 122. Should stop element 46 fail to reach position 46b (or 46c) switch 122 will remain in the valley of cam 126 to open switch 122.

Switch 122 is arranged in electrical parallel connection with a second normally closed machine power supply switch controlled by a cyclic cam such that the cam opens the second switch just after the time when element 46 is supposed to reach position 46b. Should stop 46 fail to reach position 46b (or 46c) the second switch will open its contacts; since the switch 122 contacts are also open the machine will receive no current and will consequently shut down. In general, switch 122 will power the machine through stroke 46d, and the other normally-closed switch will power the machine through the other three strokes 46e, 46f and 46g. There will be overlap periods when both switches will be in power-supply positions.

Figure 13:
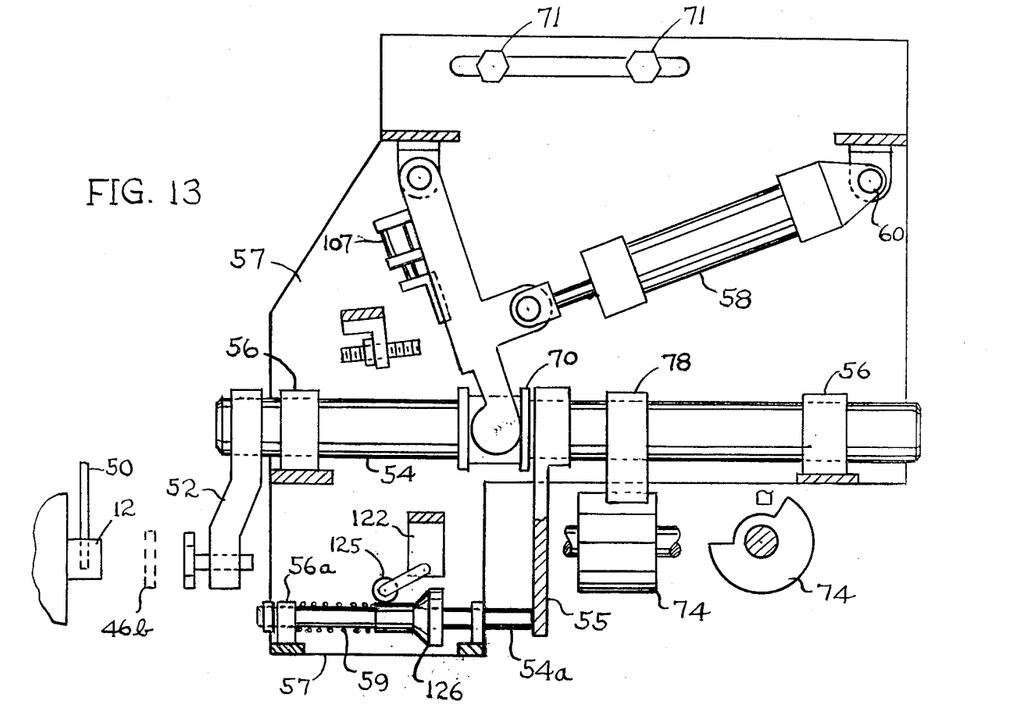
FIG. 13 is an elevational view of another embodiment of the invention.

FIG. 13 EMBODIMENT

Figure 14:
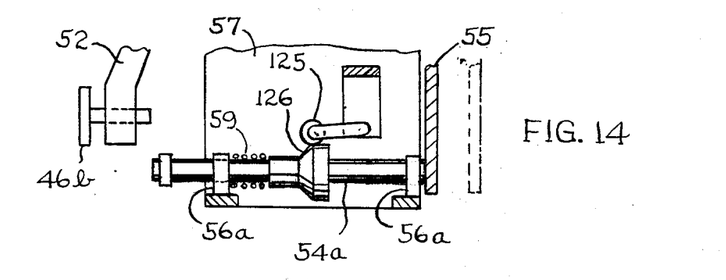
FIG. 14 is a fragmentary view of the FIG. 13 device, taken at a different stage of the machine cycle.

FIG. 13 illustrates a variation of the invention wherein the normally-open switch 122 is actuated by a shaft 54a separate from the main shaft 54. Shaft 54a is mounted for reciprocal movement in bearings 56a attached to a stationary mounting plate 57. An actuator arm 55 is suitably secured to main shaft 54 so that its free end registers with the end of shaft 54a when shaft 54 is moving leftwardly from its FIG. 13 stock-intercept position to its FIG. 14 advanced position (46b or 46c). As the main shaft 54 moves leftwardly its arm 55 propels the auxiliary shaft 54a to the FIG. 14 position for actuation of the switch 122; should shaft 54 be obstructed or otherwise fail to complete its leftward "push back" stroke the switch-operating roller 125 will remain in the valley to the left of the cam lobe 126, such that switch 122 will be open to shut-down the machine.

During rightward movement of shaft 54 (by pressurization of the left end of cylinder 58) a compression spring 59 returns the auxiliary shaft 54a to its FIG. 13 position. In general the operation of the FIG. 13 structure is similar to the operation of the FIG. 10 structure. FIG. 13 illustrates the advantageous feature wherein the mechanism is carried by a single plate 57 such that the length of feed can be varied merely by loosening the plate mount bolts 71.

Figures 15, 16, 17, 18, 19:
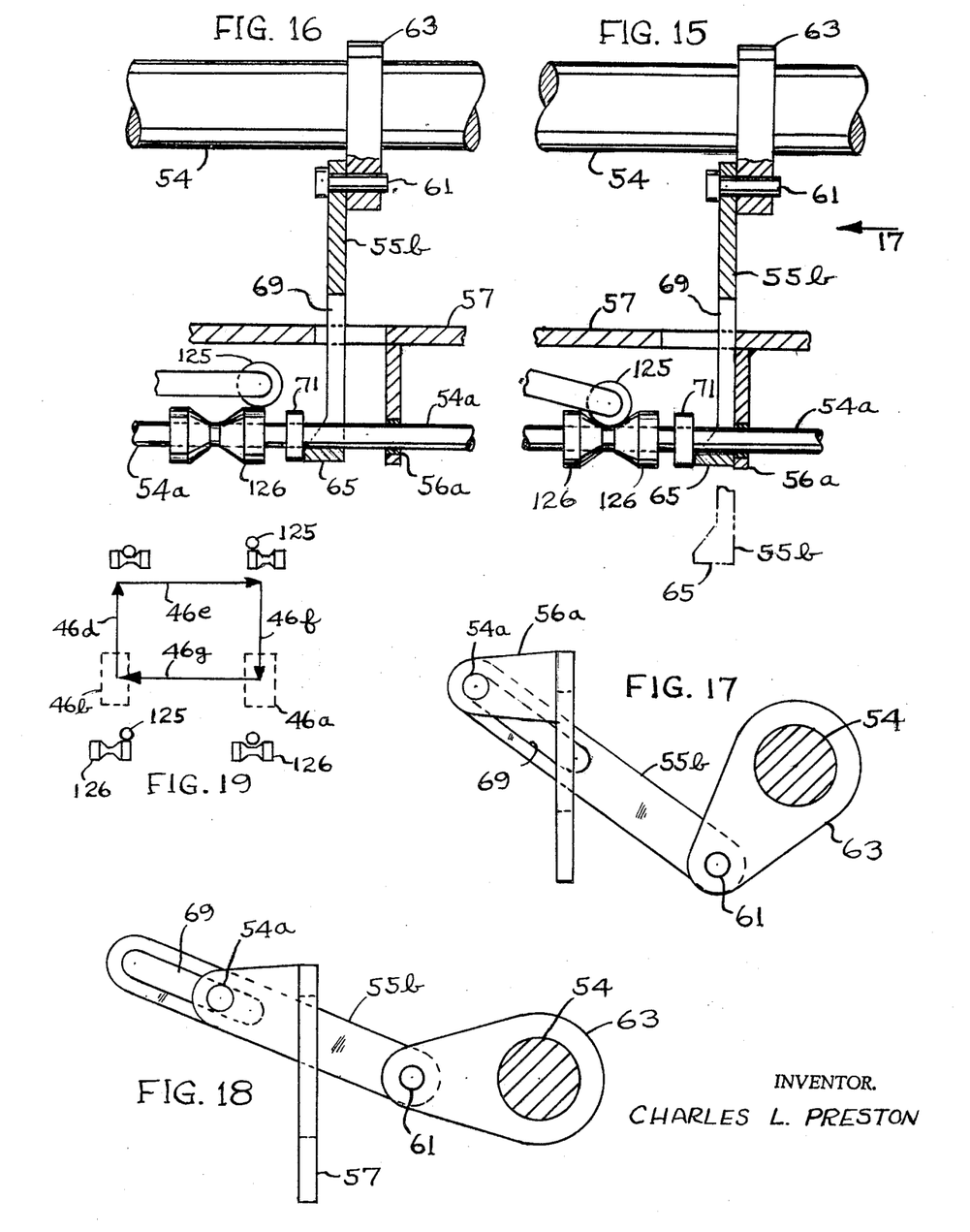
FIGS. 15 through 19 illustrate another embodiment of the invention.

FIG. 15 EMBODIMENT

FIG. 15 fragmentarily illustrates a structure quite similar to the FIG. 13 structure except that the actuator arm 55b is constructed somewhat defferently than the corresponding arm 55 shown in FIG. 13. Arm 55b has a pivotal connection 61 with a collar 63 carried by shaft 54. As shown in FIG. 17, arm 55b is provided with an enlarged cam end 65 and an elongated slot 69 such that the arm can slide transversely on shaft 54a to exert a cam effect on shaft collar 71.

FIG. 17 is a view taken in the direction of arrow 17 in FIG. 15. FIG. 18 is similar to FIG. 17 except that main shaft 54 is rotated counterclockwise approximately 55 radial degrees. FIG. 17 shows the shaft 54 arm 55b relation during the resetting stroke 46e, while FIG. 18 shows the shaft 54 arm 55b relation during the advancing or pushback stroke 46g.

FIG. 15 illustrates arm 55b in an extended dashed line position (corresponding to FIG. 18) and also in a retracted full line position (corresponding to FIG. 17). Movement of the arm from its FIG. 15 dashed line position to its FIG. 15 full line position is accomplished by counterclockwise rotation of main shaft 54, which is in turn accomplished by a cam mechanism similar to the cam device shown at 74 in FIG. 10.

As arm 55b is moved from its FIG. 15 dashed line position to its FIG. 15 full line position its cam end 65 engages a collar 71 carried by shaft 54a, such that shaft 54a is forced to the left a sufficient distance to put roller 125 in the valley between lobes 126 (as shown in FIG. 15). This corresponds to position 46a of FIG. 3. Suitable pressurization of the aforementioned cylinder 58 (FIG. 10) moves shaft 54 from its FIG. 15 position to its FIG. 16 position; during this stroke the cam end 65 propels shaft 54a leftwardly a sufficient distance to put roller 125 on the rightmost lobe 126; this corresponds to position 46b. Should shaft 54 be unable to accomplish the full leftward stroke the roller 125 will remain in the valley between lobes 126 such that the machine will shut down.

At completion of the push back stroke 46g shaft 54 will be rotated clockwise from its FIG. 17 position to its FIG. 18 position, thereby allowing cam end 65 to move outwardly from shaft 54a; this action enables a spring (not shown, but similar to spring 59 in FIG. 13) to move shaft 54a rightwardly a sufficient distance to put roller 125 in the valley between lobes 126. This operation occurs incident to stroke 46d.

Suitable pressurization of the left end of cylinder 58 returns shaft 54 rightwardly through stroke 46e, such that roller 125 is lifted onto the leftmost lobe 126. Generally, the cycle is as shown in FIG. 19, such that failure of the mechanism to accomplish its push-back stroke 46g or its reset stroke 46e will automatically stop the machine.

Figure 20:
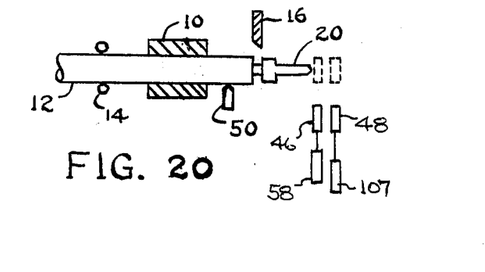
FIG. 20 schematically illustrates a still further embodiment of the invention.

FIG. 20 EMBODIMENT

FIG. 20 schematically shows another embodiment of the invention wherein the stop means has only a radial movement. The stop in this instance means comprises separate stop elements 46 and 48 movable from full line "inoperative" positions to dotted line "operative" positions. Each stop could be moved by a separate fluid cylinder 58 or 107 controlled by the machine cycle cam and detector 50, in the manner previously described. Thus, should detector 50 sense a bar remnant then cylinder 107 would be actuated; otherwise cylinder 58 would be actuated. The general operation would be similar to that of the FIG. 10 embodiment except that the structure would lack the advantageous push-back action.

FIGS. 10 and 15 are preferred embodiments of the invention, but variations or modifications can be employed. For example, cylinder 107 (FIG. 10) could be used to adjust the position of abutment 72 instead of abutment 109. Also, cylinder 58 could act directly on shaft 54 instead of through lever 66; however, that would in some cases undesirable increase the length of the unit. Other modifications are possible as will be appreciated from the appended claims.

I claim:

1. In a cutting machine wherein bar stock is fed to the machine through a chuck along a given axis, and the completed work is severed from the stock while the work is located on the given axis: the improvement comprising a powered stop operable to intercept the fed-in stock and to then push said stock back along the given axis a predetermined normal distance for enabling cutting operations to be subsequently performed thereon; means separate from the powered stop for detecting when the fed-in bar section is a remnant section too short for satisfactory machining and gripment by the chuck; and means actuated by the detecting means for causing the stop to push back the oncoming new bar a lesser-than-normal distance, whereby the leading end of the new bar can be faced off as part of the next cutting cycle.

2. In the cutting machine of claim 1: the further improvement wherein the detecting means comprises a bar-deflecting element movable into the bar profile only when the fed-in bar is an unduly short remnant; said element comprising an arm having a first swinging orbit in a plane normal to the direction of bar feed, and a second swinging orbit in a plane paralleling the direction of bar feed, whereby the arm is enabled to deflect a bar remnant by the first orbital movement, and is enabled to reset itself by riding along the side surface of the oncoming new bar as a result of combined movements in both orbits.

3. In the cutting machine of claim 2: the further improvement wherein the bar-deflecting element has a first spring bias tending to force it into the plane of the fed-in bar and a second spring bias tending to force it in the direction from whence the bar is being fed, whereby the deflecting element is maintained in pressure contact with the oncoming bar as the element undergoes its resetting motion.

4. In the cutting machine of claim 1: the further improvement wherein the detecting means includes a bar stock-engaging element located between the chuck and the work severing plane.

* * * * *